United States Patent
Shitomi

(10) Patent No.: US 7,849,129 B2
(45) Date of Patent: Dec. 7, 2010

(54) SYSTEM AND METHOD FOR PREVENTING THROUGHPUT DEPRESSION IN POWER SAVING NAS SYSTEM

(75) Inventor: Hidehisa Shitomi, Mountain View, CA (US)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 12/242,729

(22) Filed: Sep. 30, 2008

(65) Prior Publication Data

US 2010/0082729 A1 Apr. 1, 2010

(51) Int. Cl.
*G06F 15/16* (2006.01)

(52) U.S. Cl. ............... 709/202; 709/203; 709/217; 709/218; 709/219; 709/220; 709/223; 709/227

(58) Field of Classification Search ............ 709/220, 709/227, 202, 203, 217, 218, 219, 223
See application file for complete search history.

(56) References Cited

U.S. PATENT DOCUMENTS

2007/0067560 A1 3/2007 Anzai et al.

OTHER PUBLICATIONS

Colarelli, Grunwald and Neufeld, The case of massive arrays of idle disks (MAID), USENIX FAST'02, Jan. 7, 2002.

*Primary Examiner*—Liangche A Wang
(74) *Attorney, Agent, or Firm*—Sughrue Mion, PLLC

(57) ABSTRACT

To solve the problem of TCP timeout between NAS head and NAS client caused by the time required for disk drive power on, agent is installed on NAS client and a window size control program is installed on NAS head. The window size control program requests storing TCP/IP window size information at the agent at execution of the disk drive power on operation. After the disk drive power on operation completes, the window size control program requests restoring of TCP/IP window size on NAS client using the window size information stored in the agent. In another implementation, no agent is installed on NAS client. Rather, TCP/IP programs in both NAS client and NAS head are appropriately modified. The window size control program on NAS head issues a request to close TCP/IP session to TCP/IP program on the NAS client at the execution of the disk drive power off operation. After TCP connection is closed by TCP/IP program on the NAS head, the NFS program and TCP/IP program on NAS client tries to reestablish TCP/IP connection with NAS head. At that time, TCP/IP program on NAS client sets large initial send window size, and TCP/IP program on NAS head sends a large receive window size. After that, new session starts with large TCP/IP window size.

10 Claims, 12 Drawing Sheets

Fig. 5

Power Saving Management Table

| RAID Group | HDD | Status |
|---|---|---|
| 001 | 001 | OFF |
|  | 002 | OFF |
|  | 003 | OFF |
| 002 | 004 | ON |
|  | 005 | ON |
|  | 006 | ON |

Fig. 6

File System Management Table

| File System | LU (LDEV) | RAID Group |
|---|---|---|
| 001 | 001 | 001 |
| 002 | 002, 003 | 002, 003 |

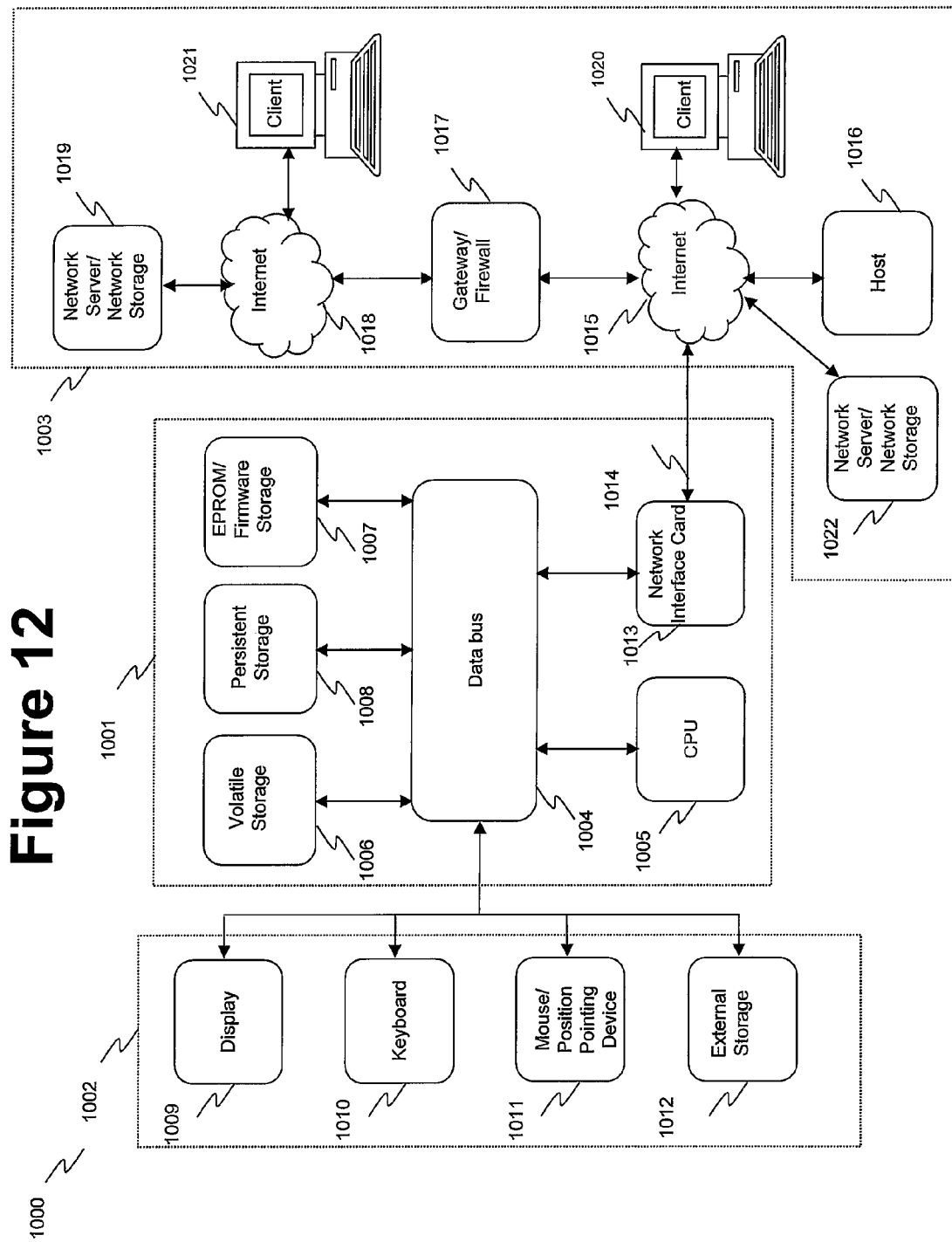

SYSTEM AND METHOD FOR PREVENTING THROUGHPUT DEPRESSION IN POWER SAVING NAS SYSTEM

DESCRIPTION OF THE INVENTION

1. Field of the Invention

This invention relates in general to storage systems, and in particular to network attached storage (NAS) systems having power saving functionality.

2. Description of the Related Art

Massive Array of Inactive Disks (MAID) technology has become popular for data storage especially for replacement of tape media. The MAID technology provides the functionality for turning off inactive (unused) hard disk drives in order to save electrical power. Furthermore, the popularity of the MAID technology stems from the fact that network attached storage (NAS) systems can utilize the aforesaid storage systems with MAID functionality.

In a typical NAS configuration, a device called NAS head operates as an interface between NAS clients and NAS storage devices storing the application data. NAS clients are usually connected to the NAS head using TCP/IP network, while NAS storage devices utilize a small computer system interface (SCSI) or a Fibre Channel (FC) protocol, well known to persons of skill in the art, for their connection to the NAS head. File access to data in NAS storage devices is accomplished using network file system (NFS) protocol. In the NAS application, the aforesaid NAS storage devices may be implemented using the MAID functionality and have the capability to be powered down when not in use by NAS clients. However, when network file system (NFS) operations on data in a powered-down disk drive occur, the NFS data access operations need to wait until the disk drive is powered back on or "wakes up." This wait time may last as long as 10-15 seconds and will result in a small computer system interface (SCSI) timeout and timeout of the TCP/IP networking protocol used by the NFS.

The aforesaid SCSI timeout issue between the NAS head and the storage system is addressed in U.S. Patent Application Publication No. 2007/0067560 to Anzai, which is incorporated herein by reference in its entirety. However, the conventional NAS systems using MAID technology have not managed to avoid the TCP/IP timeout under the NFS protocol, which occurs between the NAS client and the NAS head.

As well known to persons of skill in the art, the TCP/IP timeout threshold value is calculated by using estimated the round trip time of a network request, which is very small in the NAS environment because the TCP/IP session is created within a single data center. For this reason, this calculated value is very small and always smaller than the response time of an NFS command, which involves the drive power-on operation, which, as stated above may take 10-15 seconds. Thus, when the drive needs to be powered up during an NFS operation, a TCP/IP session timeout occurs. In accordance with the TCP/IP protocol, the occurrence of this timeout misleadingly signals to the TCP/IP network that the network is congested, which causes the TCP/IP window (the amount of data that can be sent through network at once) size to be reduced, which, in turn, causes the throughput of the TCP/IP session to dramatically decrease. In other words, the TCP timeout mechanism is implemented for network congestion control, which presupposes that the timeout is caused by the network congestion, and the TCP client needs to throttle the transmission. This mechanism is not designed for the situation when the timeout is caused by the storage drive power-on procedure, which causes the degradation of performance of the NAS.

SUMMARY OF THE INVENTION

The inventive methodology is directed to methods and systems that substantially obviate one or more of the above and other problems associated with conventional network attached storage (NAS) systems having power saving functionality.

In accordance with one aspect of the inventive methodology, there is provided a computerized storage system including a network attached storage (NAS) client having an agent; and a NAS system having a NAS head and a storage system. The NAS client is operatively coupled to the NAS head via a networking protocol. The storage system incorporates a storage controller and at least one storage device configured to store user data and further configured to be powered up and powered down. The NAS head incorporates a window size control module, which is configured to request the agent to store a network window size information at the NAS client when the at least one storage device is being powered on and after a power-on operation of the at least one storage device completes, the window size control module requests the agent to restore the network window size on the NAS client using the network window size information stored by the agent at the NAS client to prevent degradation of the network window size due to a timeout of a network connection between the NAS client and NAS head.

In accordance with another aspect of the inventive methodology, there is provided a computerized storage system including a network attached storage (NAS) client having a client networking module; and a NAS system having a NAS head and a storage system. The NAS client is operatively coupled to the NAS head via a networking protocol. The storage system incorporates a storage controller and at least one storage device configured to store user data and further configured to be powered up and powered down. The NAS head incorporates a NAS head networking module and a window size control module configured to issue a request to close a networking session to the client networking module when the at least one storage device is being powered down. The networking module reestablishes a networking connection with the NAS head and sets a large initial network send window size and in response to reestablishing of the networking connection, the NAS head networking module sets a large initial network receive window size.

In accordance with yet another aspect of the inventive methodology, there is provided a method performed in a computerized storage system including a network attached storage (NAS) client having an agent; and a NAS system having a NAS head and a storage system. The NAS client is operatively coupled to the NAS head via a networking protocol. The storage system includes a storage controller and at least one storage device configured to store user data and further configured to be powered up and powered down. The NAS head including a window size control module. The inventive method involving: the window size control module requesting the agent to store a network window size information at the NAS client when the at least one storage device is being powered on; and after a power-on operation of the at least one storage device completes, the window size control module requesting the agent to restore the network window size on the NAS client using the network window size information stored by the agent at the NAS client to prevent degradation of the network window size due to a timeout of a network connection between the NAS client and NAS head.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 5 shows an exemplary power saving management table, according to aspects of the present invention.

FIG. 6 shows an exemplary file system management table, according to aspects of the present invention.

FIGS. 7-1 and FIGS. 7-2 show a flowchart of an exemplary method of addressing the throughput depression problem, according to aspects of the invention.

FIG. 12 is a block diagram that illustrates an embodiment of a computer/server system upon which an embodiment of the inventive methodology may be implemented.

DETAILED DESCRIPTION

Figure 1:
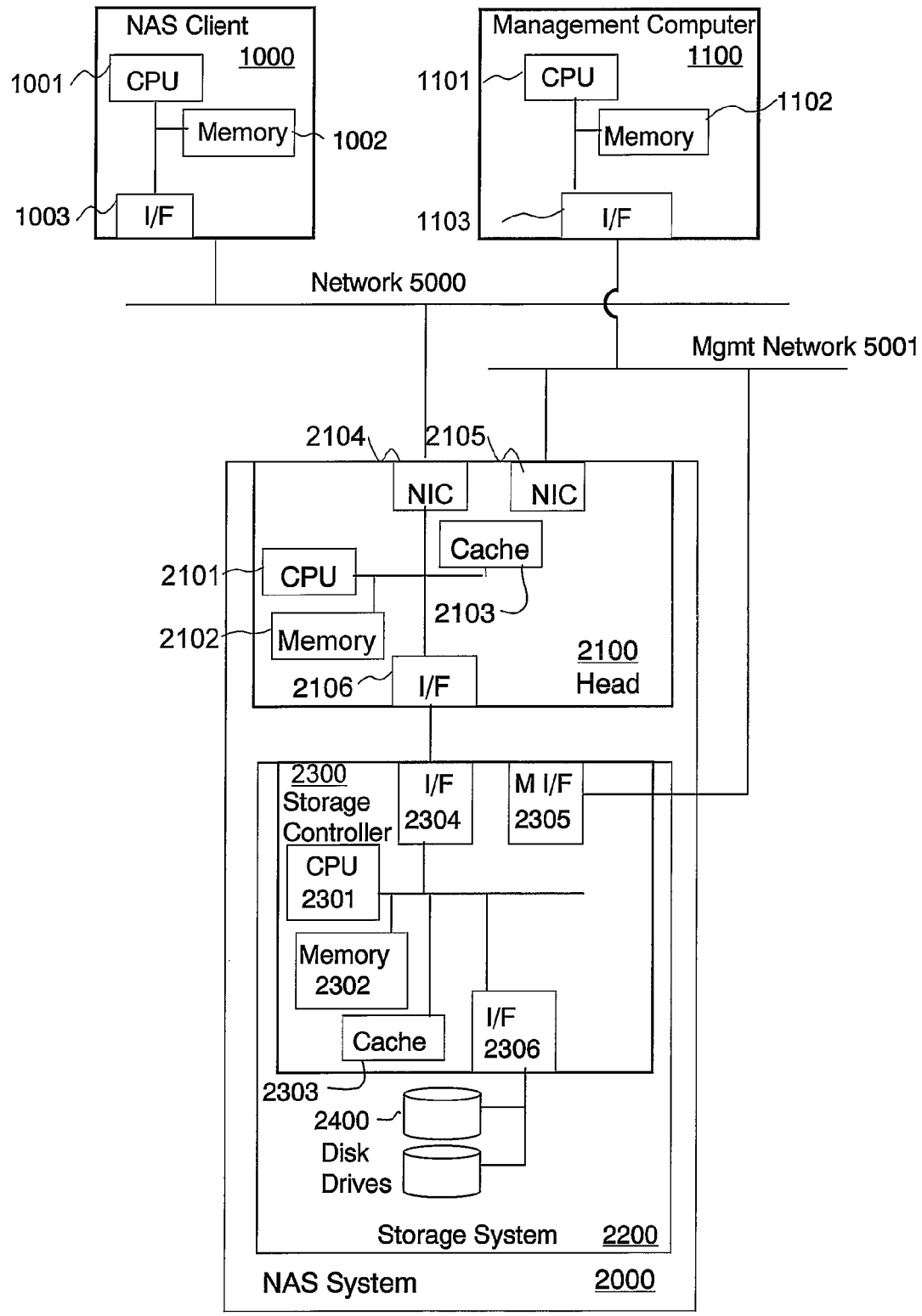
FIG. 1 shows an exemplary hardware configuration, according to aspects of the present invention.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Aspects of the present invention provide systems and methods for avoiding TCP window size depression on a NAS having a power saving feature. Specifically, one of the aspects of the present invention addresses the need for systems and methods that avoid TCP window size depression due to the storage drive power-on timeout. As would be appreciated by persons of skill in the art, unlike the TCP timeout situation that is caused by network congestion, in the NAS/MAID environment, the delayed of response to an NFS request is caused by disk wake up delay and not by network congestion. Therefore, because there is no network congestion, the TCP window size does not need to be decreased.

In one embodiment, aspects of the invention involve a configuration wherein an agent is installed on a NAS client and a window size control program is installed on the NAS head. In one embodiment, the window size control program requests storing the TCP/IP window size information at the agent at execution of the disk drive power on operation. After the disk drive power on operation completes, the window size control program requests restoring of the TCP/IP window size on the NAS client using the window size information stored in the agent.

In another embodiment, aspects of the present invention further involve a configuration, wherein no agent is installed on the NAS client. Rather, the TCP/IP programs in both the NAS client and the NAS head are appropriately modified. Specifically, the window size control program on the NAS client issues a request to close the TCP/IP session to the TCP/IP program on the NAS head at the execution of the disk drive power off operation. After the TCP connection is closed by the TCP/IP program on the NAS head, the NFS program and the TCP/IP program on the NAS client tries to reestablish the TCP/IP connection with the NAS head. At that time, the TCP/IP program on the NAS client sets a large initial send window size, and the TCP/IP program on the NAS head sends a large receive window size. After that, a new session starts with the large TCP/IP window size.

FIG. 1 illustrates an exemplary hardware configuration, according to aspects of the present invention. An embodiment of the inventive system may include one or more NAS clients 1000, a management computer 1100, and a NAS system 2000. The management computer 1100 is coupled with the NAS system 2000 through a management network 5001. The NAS clients 1000 are coupled together and to the NAS system 2000 through a network 5000, which may be implemented using the aforesaid NFS over TCP/IP protocol.

As shown in FIG. 1, the NAS clients 1000 each include a CPU 1001, a memory 1002 and an interface 1003. Applications, general network file systems such as NFSv2, v3, v4, and CIFS, and client software not shown in FIG. 1 are executed on the aforesaid CPU 1001. The NAS clients 1000 use the network interface (I/F) 1003 for coupling to the NAS system 2000 via the network 5000. In various embodiments of the invention, the data network 5000 and the management network 5001 can be either physically separate networks or logically separate networks by utilizing a network partitioning technology such as VLAN. A typical media for implementing the network 5000 and the network 5001 is Ethernet. However, the present invention is not limited to any particular network media.

The management computer 1100 also includes a CPU 1101, a memory 1102 and an interface 1103. Management software is executed on the CPU 1001. The management computer 1100 is coupled to the head 2100 by means of the network interface (I/F) 1103 and to the storage systems 2200 via the management network 5001.

The exemplary NAS system 2000 illustrated in FIG. 1 includes a NAS head 2100 and a storage system 2200. The head 2100 and the storage system 2200 can be coupled together via interfaces 2106 and 2304, respectively. The interfaces 2106 and 2304 can be implemented using SCSI technology, or any other suitable interconnect, well known to persons of skill in the art. The head 2100 and the storage system 2200 may be housed in a one storage unit, called a Filer. In that case, the two elements may be coupled via a system bus such as PCI-X. Moreover, the head can include internal disk drives without connecting to any storage controllers that include a disk drive. As would be appreciated by those of skill in the art, this configuration would be quite similar to the configuration of a general purpose server. Alternatively, the head and the controller can be physically separated. In that case, the two elements are coupled via network connections such as Fibre Channel or Ethernet. Although there are various possible hardware implementations, many implementations can be used for achieving of the configuration of the present invention. FIG. 1 depicts only a single node configuration of the NAS system. On the other hand, the NAS system can be configured as a multinode cluster. The heads or the NAS system itself may also be configured as a cluster. As would be appreciated by those of skill in the art, the cluster configuration does not limit or affect the aspects of the present invention.

In an embodiment of the invention, the storage system 2200 includes a storage controller 2300 and disk drives 2400. The NAS head 2100 may include a CPU 2101, a memory 2102, a cache 2103, a frontend network interface (NIC) 2104, a management network interface (NIC) 2105, and a disk interface (I/F) 2106. In various embodiments, the NICs 2104 and 2105 can be either physically separate or logically separate. The NAS head processes requests from the NAS clients 1000 and the management host 1100.

The program used to process NFS requests or other operations is stored in the memory 2102 of the NAS head 2100 and executed by the CPU 2101. The cache 2103 temporarily stores NFS write data from the NFS clients 1000 before the data is forwarded into the storage system 2200, or stores the NFS read data that are requested by the NFS clients 1000. The cache 2103 may be implemented as a battery backed-up nonvolatile memory, or using any other suitable technology. In another implementation, the memory 2102 and the cache memory 2103 are combined within the same memory device.

The frontend network interface 2104 is used to couple the head 2100 to the NAS clients 1000. Ethernet is a typical example of the mechanism used for coupling the aforesaid components together. On the other hand, other types of network interconnects may be used for this purpose as well. The management network interface 2105 is used to couple together the management computer 1100 and the head 2100. Ethernet is a typical example of the mechanism used to establish this connection. However, as would be appreciated by those of skill in the art, other types of network interconnects may be used for this purpose as well. The disk interface 2106 is utilized to couple the NAS head 2100 and the storage system 2200. Fibre Channel (FC) and Ethernet are typical examples of the connection mechanism used for coupling of the aforesaid components. In the implementation wherein the NAS head and the controller are disposed within a single storage unit, the connection between the NAS head 2100 and the storage controller 2300 may be implemented as an internal connection, using, for example, one of system bus architectures well known to persons of skill in the art.

In an embodiment of the invention, the storage controller 2300 includes a CPU 2301, a memory 2302, a cache memory 2303, a frontend interface 2304, a management interface (M I/F) 2305, and a disk interface (I/F) 2306. The storage controller 2300 processes I/O requests from the head 2100.

The CPU 2301 executes the programs for processing the I/O requests and/or for performing other operations of the storage system 2200. These programs are stored in the memory 2302. The cache memory 2303 temporarily stores the write data from the head 2100 before the data is stored into disk drives 2400, or the read data that are requested by the head 2100. In one embodiment, the cache memory may be implemented as a battery backed-up non-volatile memory. In another implementation, the memory 2302 and the cache memory 2303 are combined within the same memory unit or device.

The host interface 2304 is utilized to couple the head 2100 and the storage controller 2300. This coupling may be implemented using the Fibre Channel (FC) and Ethernet interconnects, although other well known implementations are also possible. Alternatively, a system bus connection such as PCI-X may also be utilized for this purpose. The management interface (M I/F) 2305 is provided to couple the management computer 1100 and the storage controller 2300. Ethernet is a typical example of the mechanism used for providing this connection, however, as would be appreciated by skilled artisans, other types of networking interconnects can be used for this purpose as well. The disk interface (I/F) 2306 is used to connect the disk drives 2400 and the storage controller 2300.

The disk drives 2400 each process the I/O requests in accordance with disk device commands such as SCSI commands. In accordance with the aspects of the present invention, the disk drives 2400 implement the power-off feature. It should be noted that the configuration illustrated in FIG. 1 is exemplary only and other appropriate hardware architectures can be used for implementing aspects of the present invention.

Figure 2:
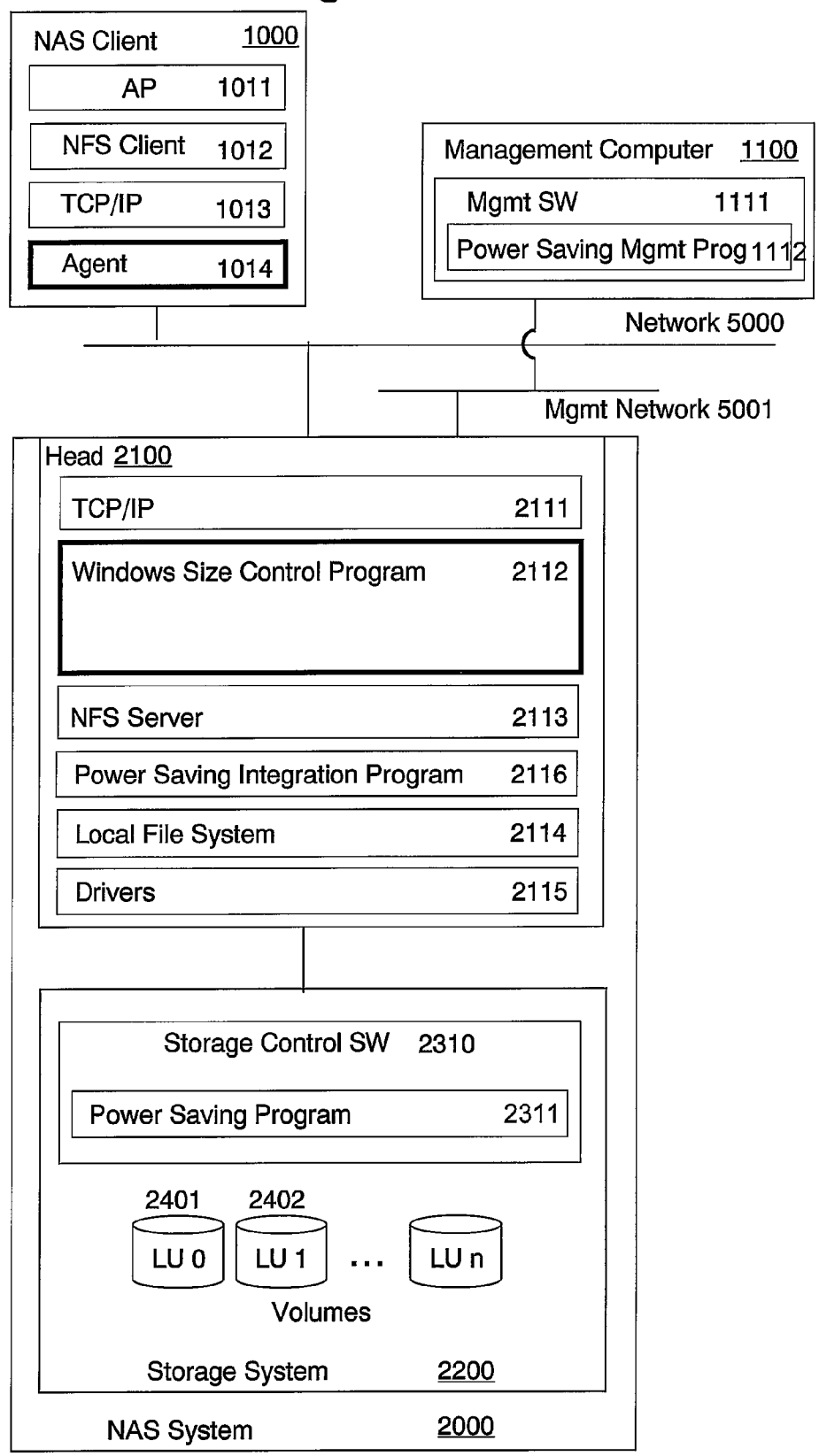
FIG. 2 shows an exemplary software configuration, according to aspects of the present invention.

FIG. 2 shows an exemplary software configuration, according to aspects of the present invention. The methods of the present invention may be implemented using, for example, the software configuration illustrated in FIG. 2. The overall system shown in FIG. 2 generally corresponds to the system of FIG. 1 and includes the NAS clients 1000, the management computer 1100, and the NAS system 2000.

Specifically, the NAS clients 1000 store and execute an application program (AP) 1011, NFS client program 1012, TCP/IP software 1013 and an agent 1014. The AP 1011 is a user application program, such as database (DB) software, which generates various file manipulating operations. Examples of the NFS client program 1012 include NFS v2, v3, v4, or CIFS software. The NFS client program 1012 communicates with the NFS server program 2113 on the NAS systems 2000 using network protocols, such as TCP/IP protocol supported by the TCP/IP software 1013. The NFS clients 1000 and the NAS system 2000 are coupled via the data network 5000, which may be implemented as a local area network (LAN). In accordance with one of the aspects of the invention, the agent 1014 stores the TCP/IP window size and also restores the window size according to the request from a window size control program 2112 that resides on the head 2100.

The management host or the management computer 1100 includes management software 1111, which, in turn, includes a power saving management program 1112. NAS management and storage management operations such as commands involving control of the system configuration settings can be issued from the management software 1111. Moreover, the power saving management program 1112 of the management computer 1100 interoperates with both a power saving integration program 2116 on the NAS head 2100 and a power saving program 2311 on the storage system 2200. A system administrator can control the power saving features of the disk drives 2400 via the power saving program 2311, which is a part of the storage control software 2310 of the storage system 2200. The controlled parameters include the timing of the disk drive power off. A power saving management table, shown in FIG. 5, is maintained by the power saving management program 1112.

As would be appreciated by those of skill in the art, the head 2100 may also be considered to be a gateway. The head 2100 is a part of the NAS system 2000. Operations of the NAS system 2000 are processed in this module. The head 2100 supports network protocols 2111 such as TCP/IP and includes a window size control program 2112, a network file system (NFS) server 2113, the power saving integration program 2116, a local file system 2114 and drivers 2115. The storage system 2200 includes the storage control software 2310, which, in turn, includes the power saving program 2311, and the logical volumes 2401, as well as other modules.

The NFS server program 2113 communicates with the NFS client 1012 on the NAS client 1000, and processes NFS operations of the file systems managed by the NAS system 2000. The NFS server program 2113 communicates with the NFS client program 1012 using a network protocols such as TCP/IP implemented by the TCP/IP software 2111.

To avoid the window size degradation, the window size control program 2112 on the NAS head 2100 requests that the NAS agent 1014 perform windows size store and restore operations. The agent 1014 is located on the NAS client 1000. Alternatively, the window size control program 2112 may close a TCP session, and intentionally cause the TCP/IP client 1013 to reestablish a TCP session. The local file system 2114 of the head 2100 processes file I/O operations for the file systems on the storage system 2200, which are located on logical volumes 2401 and 2402. The drivers 2115 of the head 2100 translate the file I/O operations into the block level operations, and communicate with the storage controller 2300 using SCSI commands.

The power saving integration program 2116 of the head issues a request for a "power-on" operation to be performed by the power saving program 2311 of the storage system 2300 before the local file system 2114 issues a SCSI command to the storage control software 2311, in order to avoid the SCSI timeout. The request is executed through the power saving management program 1112.

Figure 3:
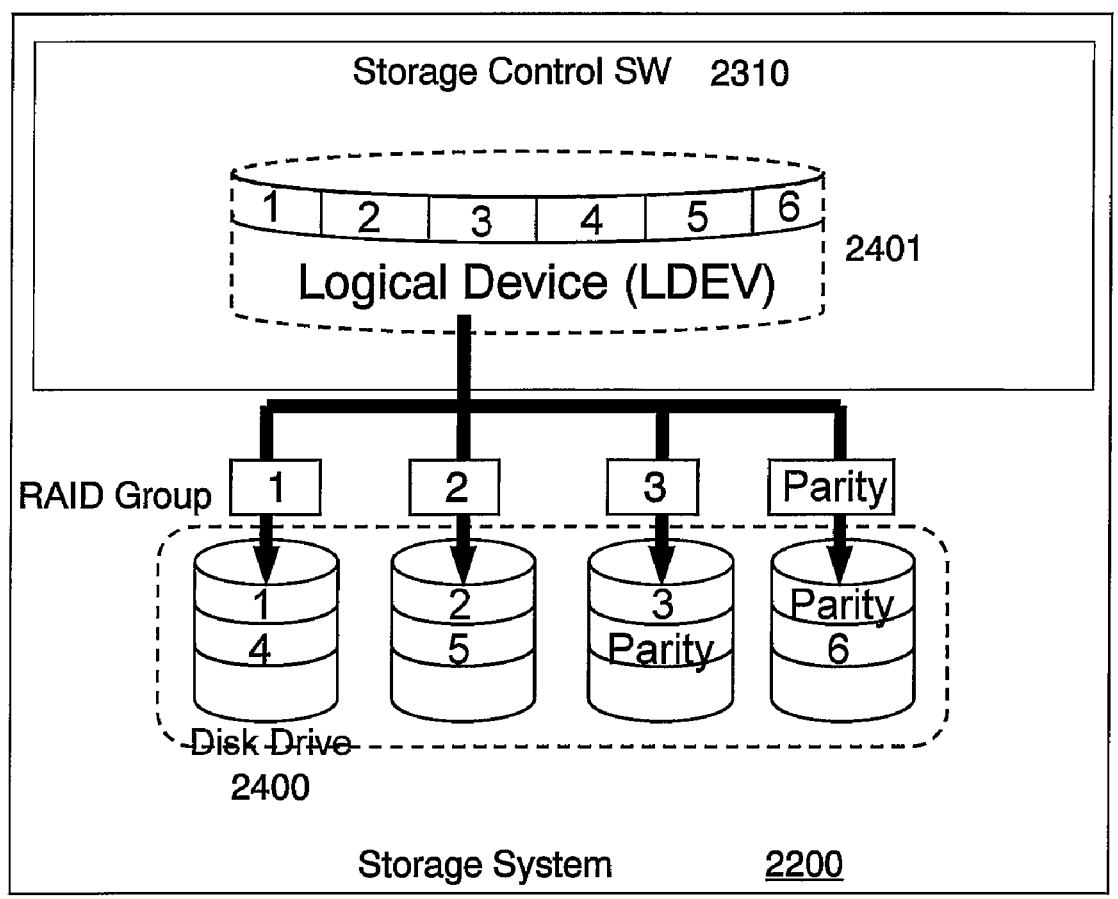
FIG. 3 shows an exemplary storage system configured in a RAID group, according to aspects of the invention.

FIG. 3 shows an exemplary storage system configured in a RAID group, according to aspects of the invention. The storage control software 2310 of the storage system 2200, processes SCSI commands from the head 2100. The volumes 2401, 2402, also called logical units or logical devices, include one or more disk drives 2400 as shown in more detail in FIG. 3. File systems are created using one volume or using multiple volumes. The power saving program 2311 controls "power-on" and "power-off" operations of the disk drives 2400. A typical granularity of the "power-off" operation is based on a RAID group, when the storage system employs RAID configuration. In other words, when the aforesaid RAID configuration is used, a "power-on" and "power-off" operations are performed with respect to all disk drives of the respective RAID group(s).

When data I/O operations for data located on a drive 2400, which has been powered off, are received, the operations need to wait until the respective disk drive "wakes up", which may take up to 10-15 seconds. The power saving integration program 2116 handles the SCSI timeout between the NAS head 2100 and the storage system 2200. However, the TCP timeout under the NFS protocol between the NAS client and NAS head cannot be avoided without the inventive window size control program 2112 and the agent 1014. As stated above, when the TCP timeout occurs, the TCP window size is dramatically decreased, and the throughput of the TCP session is also dramatically depressed.

Figure 4:
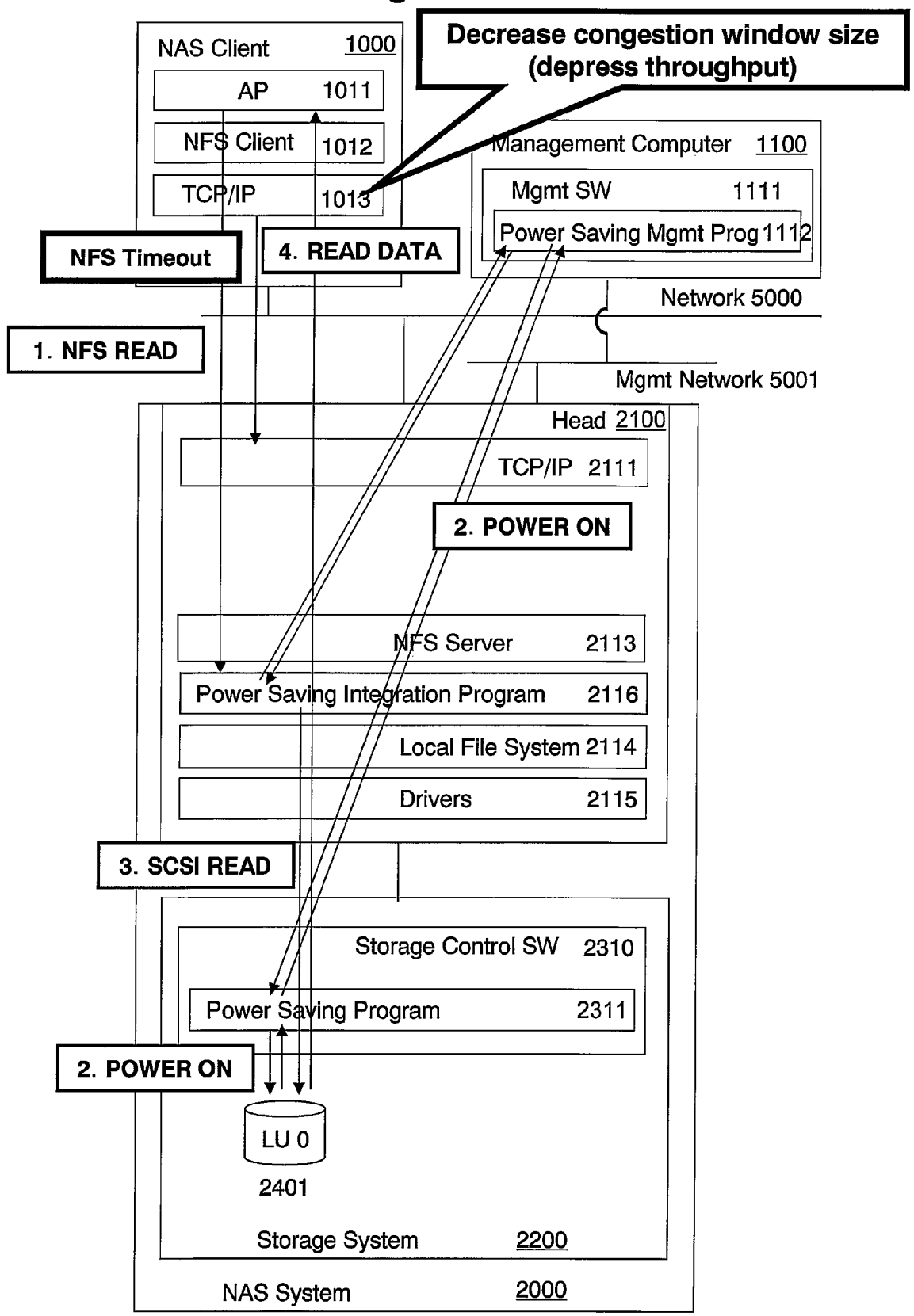
FIG. 4 shows an exemplary conceptual diagram illustrating the throughput depression problems addressed by aspects of the present invention.
Figures 1, 7:
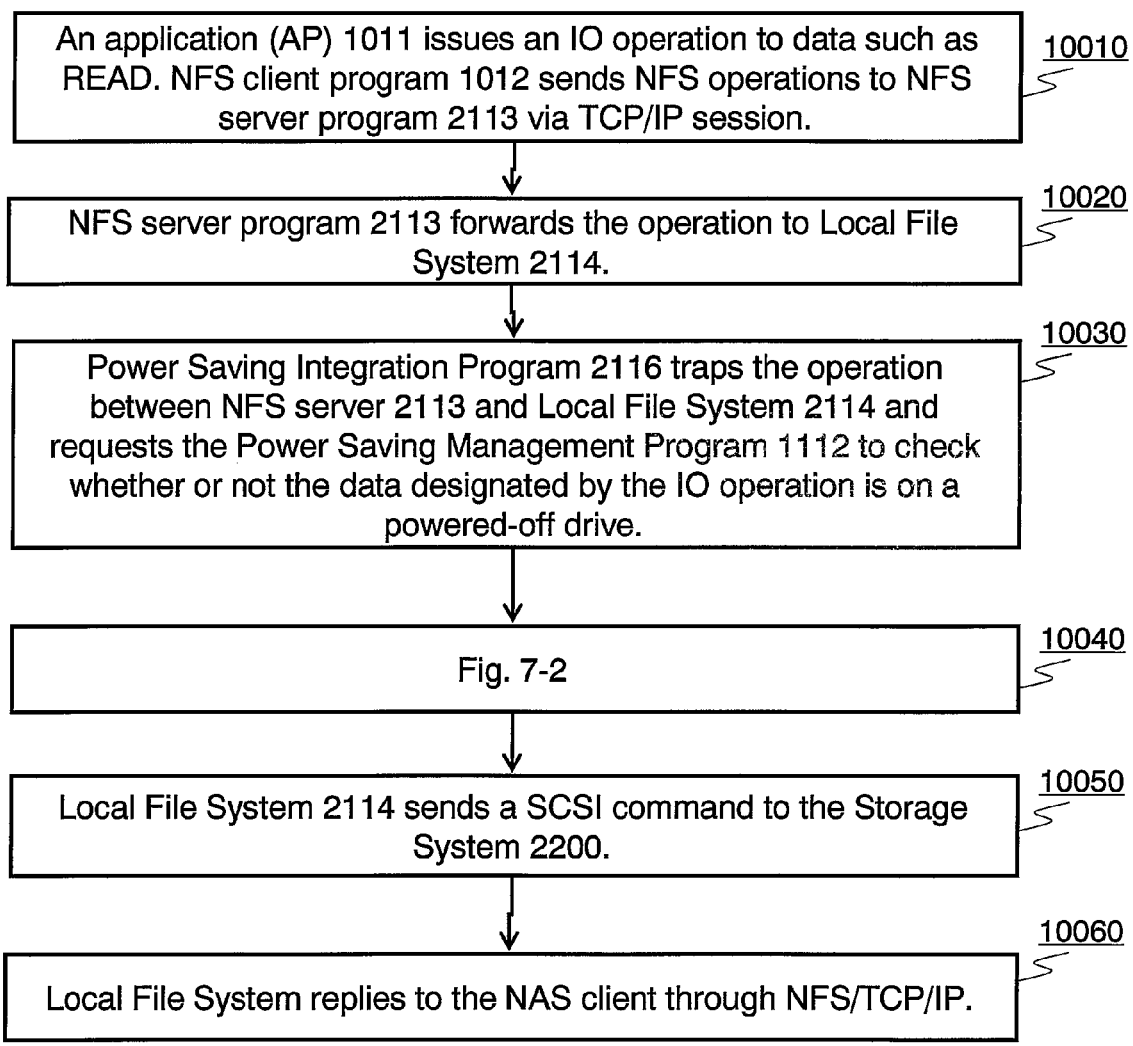
Figures 2, 7:
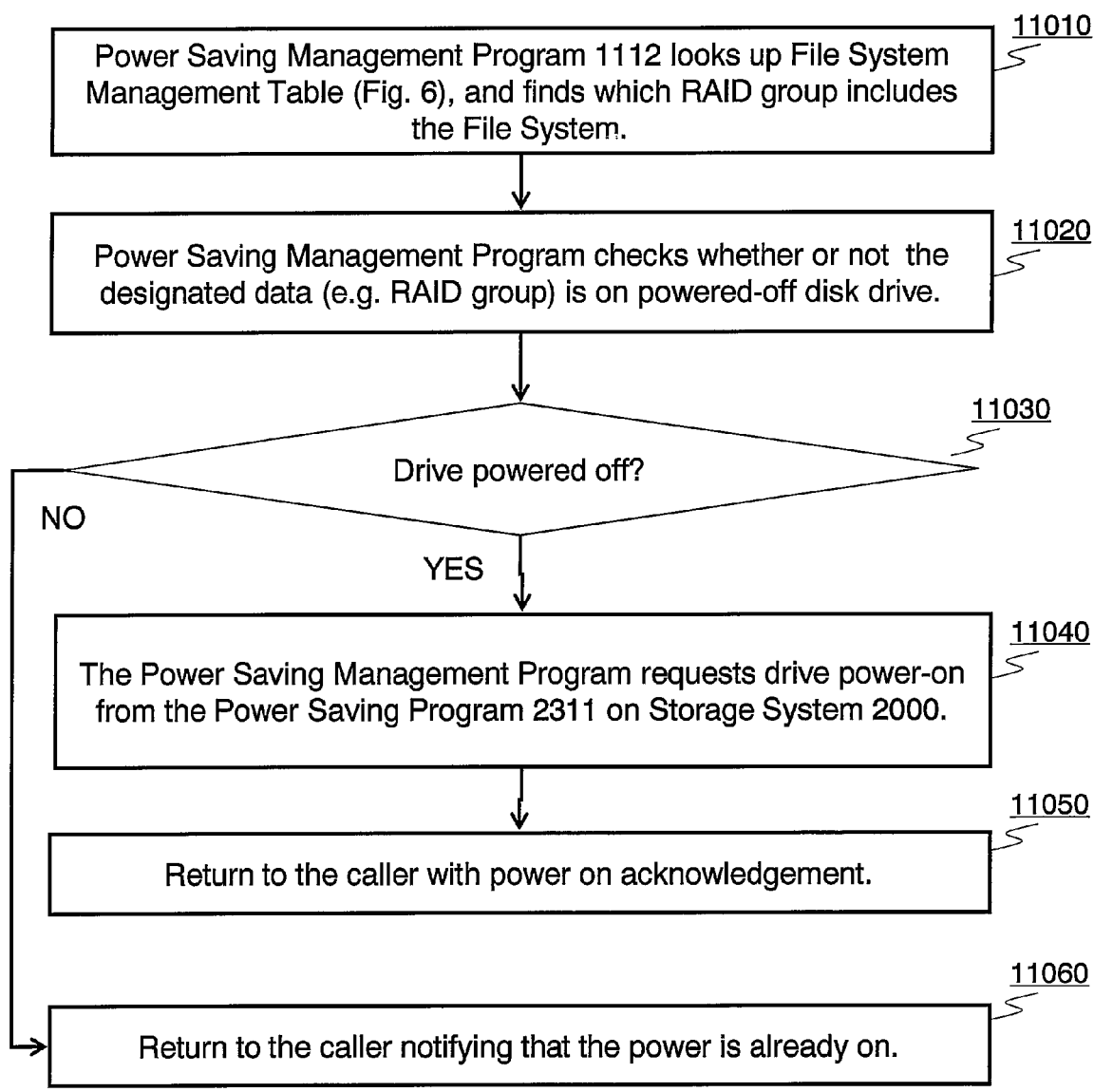

FIG. 4 shows an exemplary conceptual diagram of throughput depression problems addressed by aspects of the present invention. FIG. 5 shows an exemplary power saving management table, according to aspects of the present invention. FIG. 6 shows an exemplary file system management table, according to aspects of the present invention. FIGS. 7-1 and FIGS. 7-2 illustrate a flowchart of an exemplary method for addressing the throughput depression problem, according to aspects of the invention.

In FIG. 4, the application (AP) 1011 issues an I/O operation such as a READ operation involving reading data from the NAS system 2000. In response, the NFS client program 1012 sends corresponding NFS requests to the NFS server program 2113 via a TCP/IP session. This process is shown as step 10010 of FIG. 7-1. The NFS server program 2113 of the head 2100 forwards the NFS operation to the local file system 2114 as shown in step 10020 of FIGS. 7-1. These operations are shown on FIG. 4 as block 1 or NFS READ.

Next, the power saving integration program 2116 of the head 2100, traps (detects) the aforementioned operation between the NFS server 2113 and the local file system 2114. Accordingly, the power saving integration program 2116 also sends a request to the power saving management program 1112 to check whether or not the data designated by the I/O operation is on a powered-off drive. These operations correspond to step 10030 of FIGS. 7-1. After that, in step 11010 of FIGS. 7-2, the power saving management program 1112 refers to the file system management table, shown in FIG. 6, and finds which RAID group includes the file system affected by the I/O operation. In step 11020 shown in FIGS. 7-2, the power saving management program 1112 checks whether or not the designated data, e.g. the RAID group, is located on a power-off disk drive. If the designated data is on a power-off disk drive, the process proceeds to step 11040. Next, in step 11040 of FIGS. 7-2, the power saving management program requests the power-on operation to be performed from the power saving program 2311 on the storage system 2000. After the step 11040, in step 11050 of FIGS. 7-2, an acknowledgment is returned to the requestor that the power is now on in the storage area including the requested data. If the designated data is not located on a powered-off disk drive, the process proceeds to step 11060 of FIGS. 7-2. At step 11060 of FIGS. 7-2, the system notifies the requestor that the power has been on and the process continues back to the process shown in the flowchart of FIGS. 7-1. The aforesaid steps described in this paragraph correspond the second block 2: POWER ON shown in FIG. 4.

In an alternative implementation, the power saving management program 1112, the power saving management table shown in FIG. 5, and the file system management table of FIG. 6 can be located on the NAS head 2100. Moreover, in an implementation wherein the storage system does not employ RAID technology, the entries of the file system management table of FIG. 5 will include the file system and the HDD entries, and the power saving management table of FIG. 6 will include the HDD and status entries. However, the status of the HDDs can be checked in a similar manner as described above.

After the drive is powered-on, the local file system 2114 sends a SCSI command to the storage system 2200 in step 10050 of FIGS. 7-1. The step of this paragraph corresponds the third block 3: SCSI READ shown in FIG. 4.

Next, in step 10060 of FIGS. 7-1, the local file system replies to the NAS client through the NFS/TCP/IP. Due to the power saving integration program 2116, the drive has already "woken-up" due to the SCSI command send by local file system 2114, considering that the SCSI command does not have to be subject to timeout. Moreover, the timeout value of the NFS session between the NFS client 1012 and the NFS server 2113 is sufficiently larger than the response time of the NFS command including the drive power-on. For example, the value of NFSv3 is either 60 seconds (at soft-mount) or infinite (at hard-mount). The value of CIFS is about 60 seconds. Furthermore, even if timeout happens, the NFS protocol tries to reestablish the session again. In this case, the timeout does not affect the application. However, the TCP timeout happens during the NFS session between the NFS client 1012 and the NFS server 2113. The TCP timeout value is calculated by using estimated round trip time, which is very small in the relevant environment because the TCP session is created within a single data center. Then, the TCP timeout value is smaller than the response time of the NFS command including the delay associated with the drive power-on. The timeout causes the TCP window size to be reduced, which results in the throughput of the TCP session to be dramatically decreased.

As stated above, the TCP timeout mechanism is implemented for the network congestion control and not for dealing with hard drive power-on situation. During congestion, the timeout is caused by the network congestion, and the TCP client needs to throttle the transmission. On the contrary, in the described environment, the delay of response is caused by the disk "wake up" time, not by network congestion. As a result, the TCP window size does not have to be decreased.

Aspects of the invention provide a mechanism for avoiding the aforesaid unintended TCP window size depression.

Figure 8:
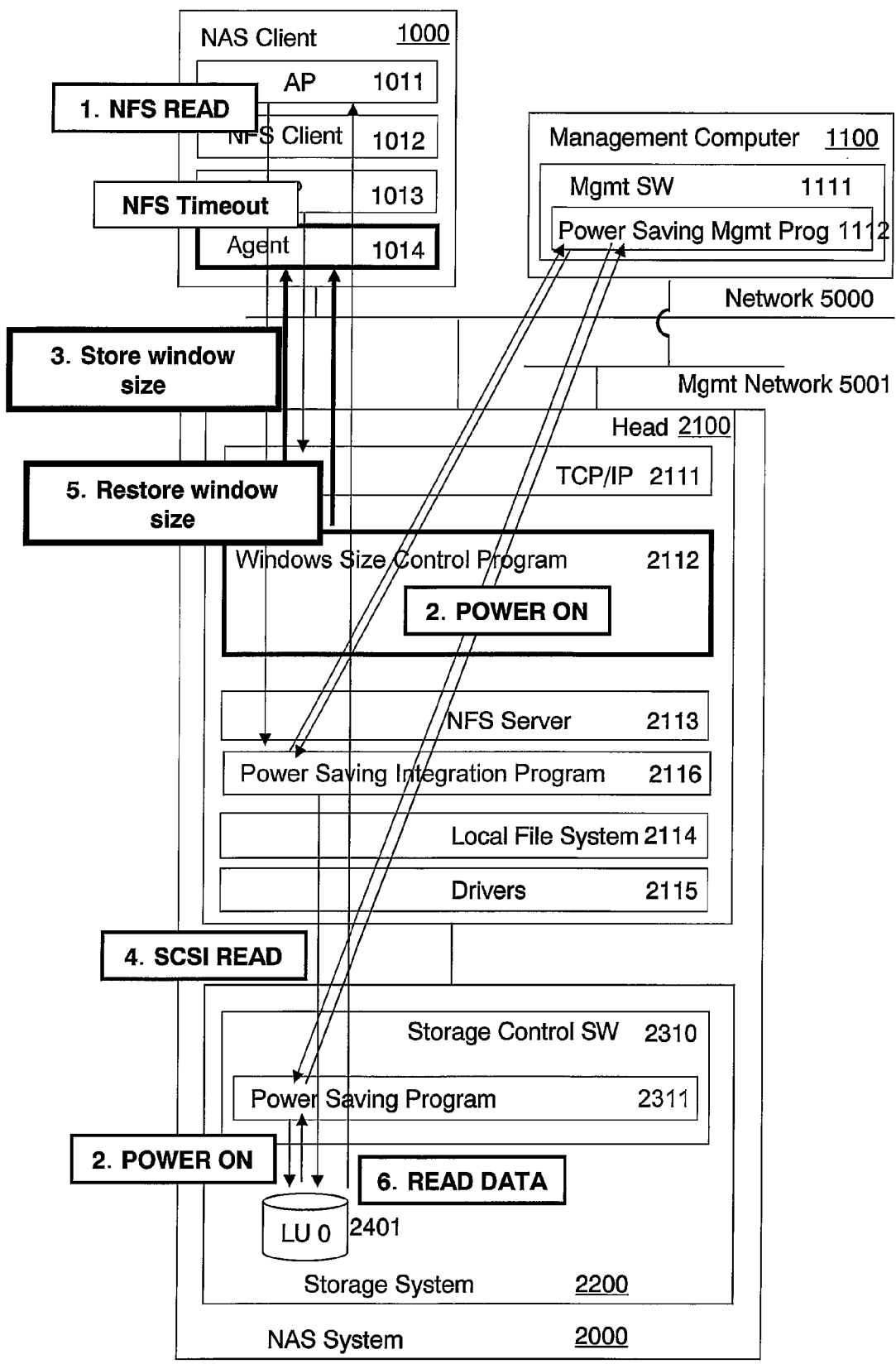
FIG. 8 shows an exemplary conceptual diagram of an embodiment of the inventive system addressing throughput depression problems.

FIG. 8 shows an exemplary conceptual diagram of a solution to throughput depression problems, according to aspects of the present invention. Specifically, FIG. 8 shows a solution involving installing a client agent. An agent 1014 is installed on the NAS client 1000. The agent works with the window size control program 2112 of the NAS head to avoid TCP window size depression.

Figure 9:
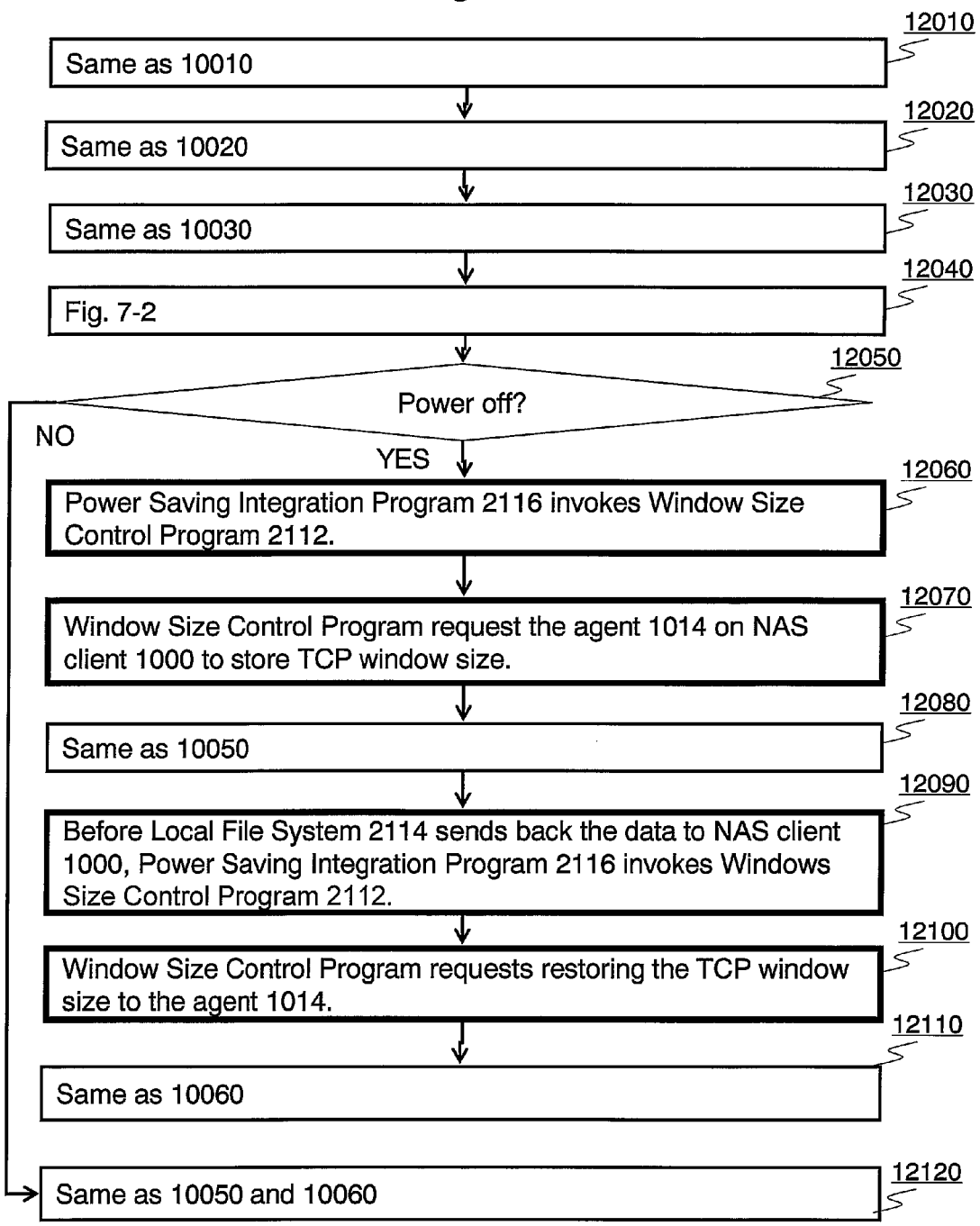
FIG. 9 shows a flowchart of an exemplary method of addressing the throughput depression problem, according to aspects of the invention.

FIG. 9 shows a flowchart of an exemplary method for addressing the throughput depression problem, according to aspects of the invention. In the flowchart of FIG. 9, which generally corresponds to the conceptual diagram of FIG. 8, the Block 1. NFS READ of FIG. 8 and step 12010 of FIG. 9 generally corresponds to the step 10010 of FIGS. 7-1, which have been described above.

Block 2. POWER ON of FIG. 8 and steps 12020, and 12030 of FIG. 9 generally correspond to steps 10020, and 10030 of FIG. 8, which have been described above.

The process shown in the flowchart of FIG. 9 proceeds to steps 12060 through 12110 if the requested data is on a powered-off drive and to step 12120 if the requested data is not on a powered-off drive.

The Block 3: Store Window size of FIG. 8 corresponds to the steps 12060 and 12070 of FIG. 9. In step 12060 of FIG. 9, if the data is on the powered-off drive, the power saving integration program 2116 invokes the window size control program 2112. Then at step 12070, the Window Size Control Program request the agent 1014 on NAS client 1000 to store TCP window size. The TCP session ID is used as an identifier for the stored TCP window size.

The Block 4: SCSI READ of FIG. 8 corresponds to step 12120 of FIG. 9 and step 10050 of FIGS. 7-1, which have been described above.

The Block 5: Restore window size of FIG. 8 corresponds to the step 12090 of FIG. 9. Before the local file system 2114 sends back the data to the NAS client 1000, if the data is located on the power-off drive, the power saving integration program 2116 invokes the windows size control program 2112 in step 12090. Next, at step 12100, the window size control program requests restoring the TCP window size from the agent 1014.

The Block 6: READ DATA of FIG. 8 corresponds to step 12110 of FIG. 9 and step 10060 of FIGS. 7-1, which have been described above.

Figure 10:
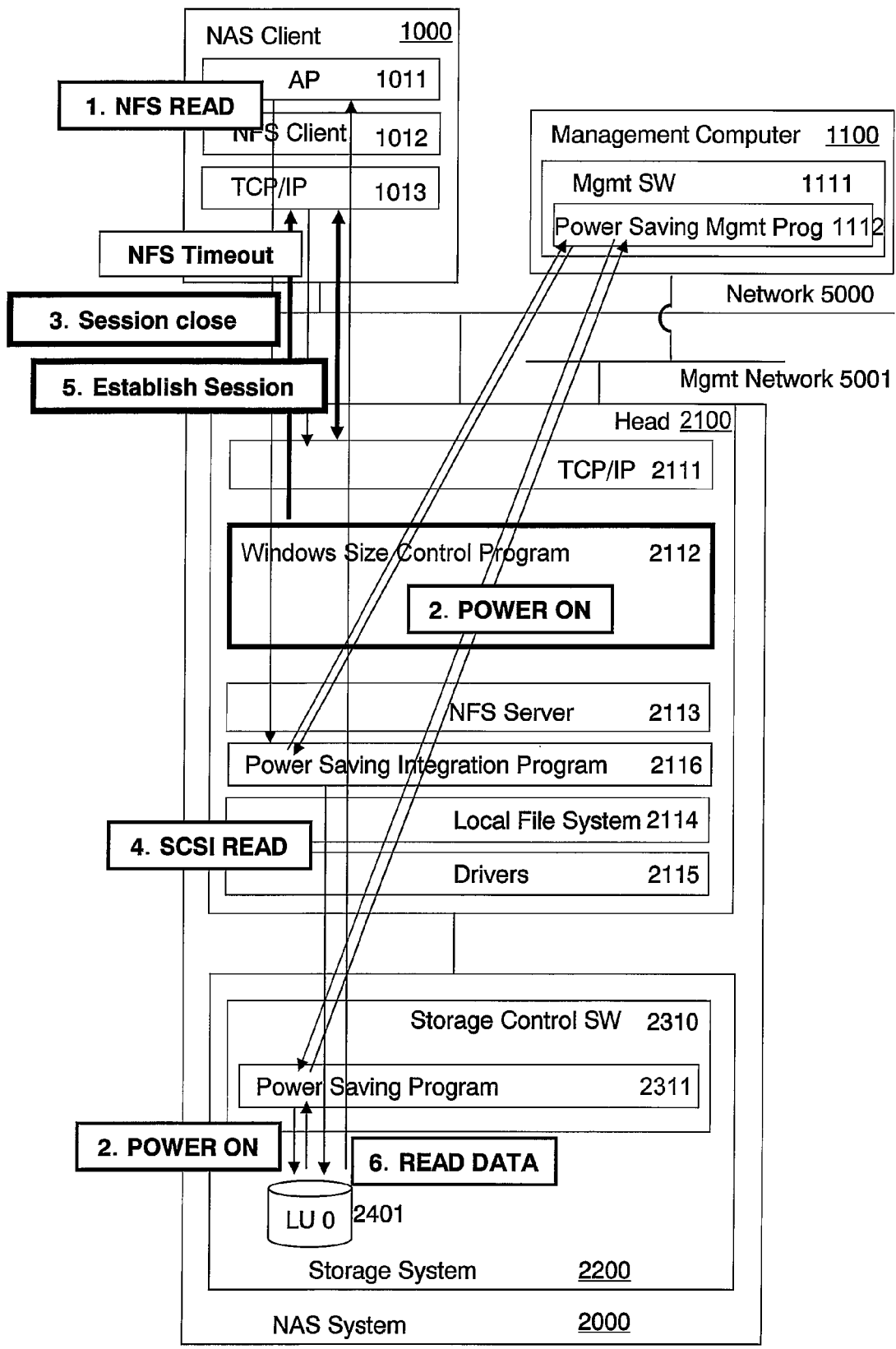
FIG. 10 shows another exemplary hardware configuration, according to aspects of the present invention.

FIG. 10 shows another exemplary hardware configuration, according to aspects of the present invention. Specifically, FIG. 10 represents a conceptual diagram of another aspect of the invention where no agent is installed on the NAS client 1000. In this aspect, the TCP/IP program 1013 of the NAS client 1000 is modified instead.

Figure 11:
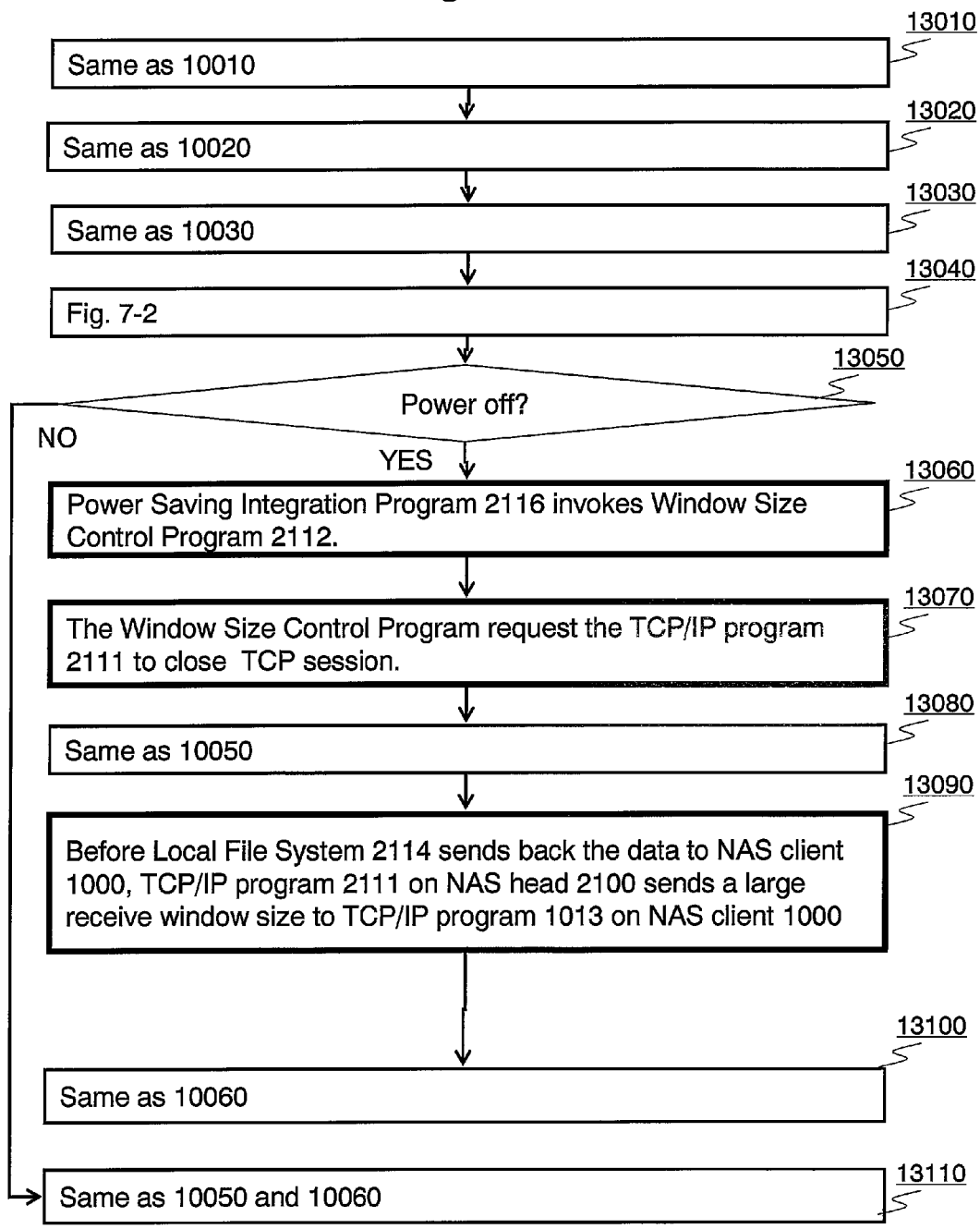
FIG. 11 shows a flowchart of an exemplary method of addressing the throughput depression problem corresponding to the exemplary hardware of FIG. 10, according to aspects of the invention.

FIG. 11 shows a flowchart of an exemplary method of addressing the throughput depression problem correspond to the exemplary hardware configuration of FIG. 10, according to aspects of the invention.

The Block 1: NFS READ of FIG. 10 corresponds to step 13010 of FIG. 11 and step 10010 of FIGS. 7-1, which have been described above.

The Block 2: POWER ON of FIG. 10 corresponds to step 13020 and step 10030 of FIG. 11 and steps 10020 and 10030 of FIGS. 7-1, respectively, which have been described above.

Block 3: Session close of FIG. 10 corresponds to steps 13060 and 13070 of FIG. 11. If the requested data is on the power-off drive, the power saving integration program 2116 invokes the window size control program 2112 in step 13060 of FIG. 11. Then, the window size control program requests a TCP session close from TCP/IP program 2111 in step 13070.

Block 4. SCSI READ of FIG. 10 corresponds to step 13080 of FIG. 11 and step 10050 of FIGS. 7-1, which have been previously described.

Block 5: Session establishing block of FIG. 10 corresponds to step 13090 of FIG. 11. When the TCP session is closed, the NFS client program 1012 on the NAS client 1000 tries to reestablish the TCP session. At this time, the TCP/IP program 1013 utilizes the predetermined send window size. Then, the administrator should set the value as large as possible. Before the local file system 2114 sends back the data to NAS client 1000, the TCP/IP program 2111 on the NAS head 2100 should send a large receive window size to the TCP/IP program 1013 on the NAS client 1000 in step 13090. The TCP/IP program 2111 is modified to do the above operation when it closes a TCP session, and receives a reconnection request operation from the same client.

Block 6. READ DATA of FIG. 9 corresponds to the step 13110 of FIG. 11 and step 10060 of FIGS. 7-1, which have been described above.

To avoid always using a large send window size, the TCP/IP program on the NAS client is also modified, and sends a large send window size only when reestablishing the NFS session.

FIG. 12 is a block diagram that illustrates an embodiment of a computer/server system 1200 upon which an embodiment of the inventive methodology may be implemented. The system 1200 includes a computer/server platform 1201, peripheral devices 1202 and network resources 1203.

The computer platform 1201 may include a data bus 1204 or other communication mechanism for communicating information across and among various parts of the computer platform 1201, and a processor 1205 coupled with bus 1201 for processing information and performing other computational and control tasks. Computer platform 1201 also includes a volatile storage 1206, such as a random access memory (RAM) or other dynamic storage device, coupled to bus 1204 for storing various information as well as instructions to be executed by processor 1205. The volatile storage 1206 also may be used for storing temporary variables or other intermediate information during execution of instructions by processor 1205. Computer platform 1201 may further include a read only memory (ROM or EPROM) 1207 or other static storage device coupled to bus 1204 for storing static information and instructions for processor 1205, such as basic input-output system (BIOS), as well as various system configuration parameters. A persistent storage device 1208, such as a magnetic disk, optical disk, or solid-state flash memory device is provided and coupled to bus 1201 for storing information and instructions.

Computer platform 1201 may be coupled via bus 1204 to a display 1209, such as a cathode ray tube (CRT), plasma display, or a liquid crystal display (LCD), for displaying information to a system administrator or user of the computer platform 1201. An input device 1210, including alphanumeric and other keys, is coupled to bus 1201 for communicating information and command selections to processor 1205. Another type of user input device is cursor control device 1211, such as a mouse, a trackball, or cursor direction keys for communicating direction information and command selections to processor 1204 and for controlling cursor movement on display 1209. This input device typically has two degrees of freedom in two axes, a first axis (e.g., x) and a second axis (e.g., y), that allows the device to specify positions in a plane.

An external storage device 1212 may be coupled to the computer platform 1201 via bus 1204 to provide an extra or removable storage capacity for the computer platform 1201. In an embodiment of the computer system 1200, the external removable storage device 1212 may be used to facilitate exchange of data with other computer systems.

The invention is related to the use of computer system 1200 for implementing the techniques described herein. In an embodiment, the inventive system may reside on a machine such as computer platform 1201. According to one embodiment of the invention, the techniques described herein are performed by computer system 1200 in response to processor 1205 executing one or more sequences of one or more instructions contained in the volatile memory 1206. Such instructions may be read into volatile memory 1206 from another computer-readable medium, such as persistent storage device 1208. Execution of the sequences of instructions contained in the volatile memory 1206 causes processor 1205 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1205 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 1208. Volatile media includes dynamic memory, such as volatile storage 1206. Transmission media includes coaxial cables, copper wire and fiber optics, including the wires that include data bus 1204. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1205 for execution. For example, the instructions may initially be carried on a magnetic disk from a remote computer. Alternatively, a remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on the data bus 1204. The bus 1204 carries the data to the volatile storage 1206, from which processor 1205 retrieves and executes the instructions. The instructions received by the volatile memory 1206 may optionally be stored on persistent storage device 1208 either before or after execution by processor 1205. The instructions may also be downloaded into the computer platform 1201 via Internet using a variety of network data communication protocols well known in the art.

The computer platform 1201 also includes a communication interface, such as network interface card 1213 coupled to the data bus 1204. Communication interface 1213 provides a two-way data communication coupling to a network link 1214 that is coupled to a local network 1215. For example, communication interface 1213 may be an integrated services digital network (ISDN) card or a modem to provide a data communication connection to a corresponding type of telephone line. As another example, communication interface 1213 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 1213 sends and receives electrical, electromagnetic or optical signals that carry digital data streams representing various types of information.

Network link 1213 typically provides data communication through one or more networks to other network resources. For example, network link 1214 may provide a connection through local network 1215 to a host computer 1216, or a network storage/server 1217. Additionally or alternatively, the network link 1213 may connect through gateway/firewall 1217 to the wide-area or global network 1218, such as an Internet. Thus, the computer platform 1201 can access network resources located anywhere on the Internet 1218, such as a remote network storage/server 1219. On the other hand, the computer platform 1201 may also be accessed by clients located anywhere on the local area network 1215 and/or the Internet 1218. The network clients 1220 and 1221 may themselves be implemented based on the computer platform similar to the platform 1201.

Local network 1215 and the Internet 1218 both use electrical, electromagnetic or optical signals that carry digital data streams. The signals through the various networks and the signals on network link 1214 and through communication interface 1213, which carry the digital data to and from computer platform 1201, are exemplary forms of carrier waves transporting the information.

Computer platform 1201 can send messages and receive data, including program code, through the variety of network(s) including Internet 1218 and LAN 1215, network link 1214 and communication interface 1213. In the Internet example, when the system 1201 acts as a network server, it might transmit a requested code or data for an application program running on client(s) 1220 and/or 1221 through Internet 1218, gateway/firewall 1217, local area network 1215 and communication interface 1213. Similarly, it may receive code from other network resources.

The received code may be executed by processor 1205 as it is received, and/or stored in persistent or volatile storage devices 1208 and 1206, respectively, or other non-volatile storage for later execution. In this manner, computer system 1201 may obtain application code in the form of a carrier wave.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the network attached storage (NAS) systems having power saving functionality. It is intended that the specification and examples be considered as exemplary only, with a true scope and spirit of the invention being indicated by the following claims.

What is claimed is:

1. A computerized storage system comprising:
   a. a network attached storage (NAS) client comprising an agent; and
   b. a NAS system comprising a NAS head and a storage system, the NAS client being operatively coupled to the NAS head via a networking protocol, the storage system comprising a storage controller and at least one storage device operable to store user data and further operable to be powered up and powered down, the NAS head comprising a window size control module, the window size control module operable to request the agent to store a network window size information at the NAS client when the at least one storage device is being powered on and after a power-on operation of the at least one storage device completes, the window size control module is operable to request the agent to restore the network window size on the NAS client using the network window size information stored by the agent at the NAS client to prevent degradation of the network window size due to a timeout of a network connection between the NAS client and NAS head.

2. The computerized storage system of claim 1, wherein the networking protocol is a TCP/IP protocol and wherein the network window size is a TCP/IP window size.

3. The computerized storage system of claim 1, further comprising a management computer operatively coupled to the NAS system, the management computer comprising a power saving management module operable to control at least one power saving parameter associated with the at least one storage device.

4. The computerized storage system of claim 1, wherein the storage controller comprises a further comprising a power saving module operable to cause the at least one storage device to be powered up and powered down.

5. The computerized storage system of claim 4, wherein the at least one storage device comprises a parity group comprising a plurality of disk drives and wherein the power saving module is operable to cause all of the plurality of disk drives within the parity group to be powered up or powered down simultaneously.

6. The computerized storage system of claim 1, wherein the NAS client comprises at least one application operable to issue a data access operation directed to the user data stored in the storage system via NAS head using network file system (NFS) protocol.

7. The computerized storage system of claim 6, wherein the NAS head comprises a local file system and wherein the data access operation is forwarded to the local file system.

8. The computerized storage system of claim 7, comprising a management computer operatively coupled to the NAS system, the management computer comprising a power saving management module, wherein the NAS head comprises a power saving integration module, the power saving integration module operable to detect the data access operation and to request the power saving management module to verify whether or not the user data targeted by the data access operation is located on a powered-off storage device.

9. The computerized storage system of claim 8, wherein the power saving management module is operable to determine a parity group, which includes the local file system; to check whether or not the parity group including the local file system is powered off and, if so, send a power-on request to the power saving module of the storage controller.

10. A method comprising:
    a. a window size control module requesting an agent to store a network window size information at a NAS client when at least one storage device is being powered on; and
    b. after a power-on operation of the at least one storage device completes, the window size control module requesting the agent to restore a network window size on the NAS client using the network window size information stored by the agent at the NAS client to prevent degradation of the network window size due to a timeout of a network connection between the NAS client and NAS head;

wherein the method is performed in a computerized storage system comprising:

the network attached storage (NAS) client comprising the agent; and a NAS system comprising the NAS head and a storage system, the NAS client being operatively coupled to the NAS head via a networking protocol, the storage system comprising a storage controller and the at least one storage device operable to store user data and further operable to be powered up and powered down, the NAS head comprising the window size control module.

* * * * *